April 9, 1929.   R. T. GRIFFITHS   1,708,059
METHOD OF MAKING WINDOW GUIDES
Filed July 22, 1926
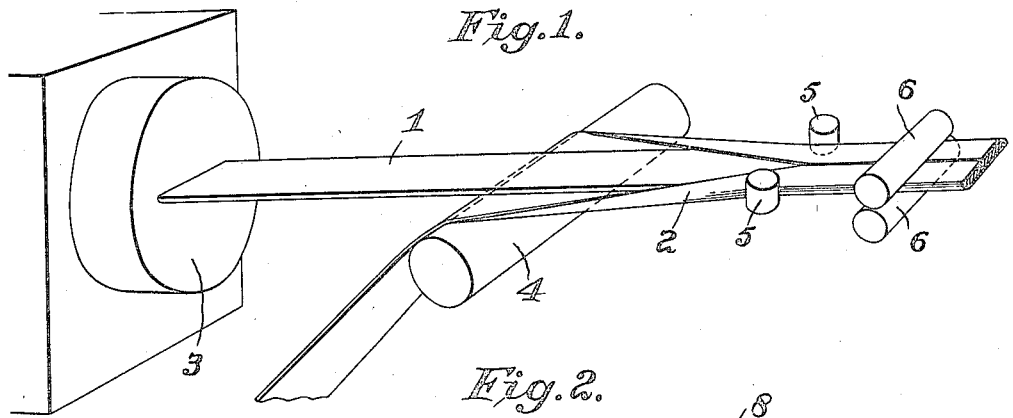
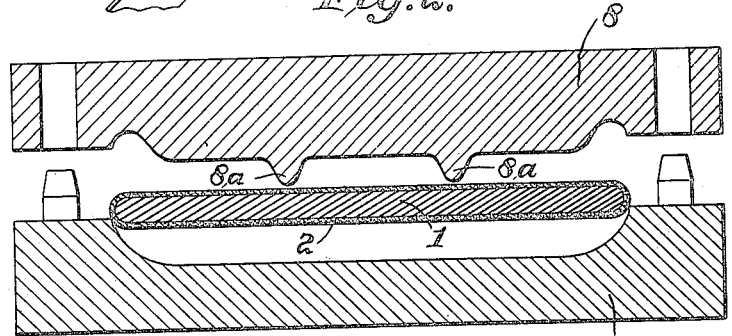
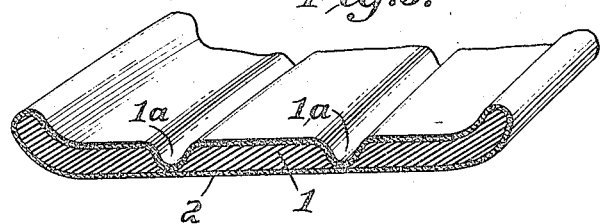
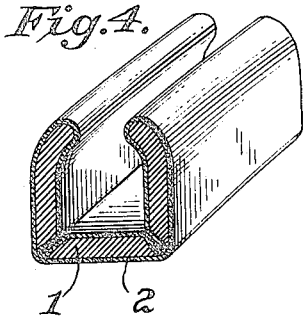
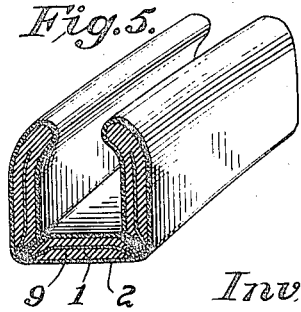
Inventor:
Richard T. Griffiths,
by Spear Middleton Donaldson & Hall
Attys.

Patented Apr. 9, 1929.

1,708,059

UNITED STATES PATENT OFFICE.

RICHARD T. GRIFFITHS, OF AKRON, OHIO, ASSIGNOR TO THE MILLER RUBBER COMPANY, OF AKRON, OHIO, A CORPORATION OF OHIO.

METHOD OF MAKING WINDOW GUIDES.

Application filed July 22, 1926. Serial No. 124,263.

My present invention relates to improvements in flexible window guides for the sliding windows of motor vehicle bodies and the like of the type having a body of rubber and a surfacing of fabric such as felt.

The invention aims to provide a guide, which may be manufactured in flat form, thereby facilitating its manufacture, simplifying its handling and shipment, and enabling its more ready application to the window.

With these and other objects in view the invention includes the novel method hereinafter described, and defined by the appended claims.

In order that the invention may be more readily understood reference is made to the accompanying drawings in which:—

Figure 1 is a perspective view of a diagrammatic nature showing one manner in which the rubber strip may be produced with a fabric covering.

Fig. 2 is a transverse vertical section through a mold for shaping and vulcanizing the article.

Fig. 3 is a perspective view of the completed article, partly broken away.

Fig. 4 is a perspective view of the article, partly broken away, and folded in position for use.

Fig. 5 is a similar view of a modification.

In proceeding according to my method I provide a strip or slab of unvulcanized rubber compound 1 with an envelope or covering 2 of felt or other suitable fabric. This may conveniently, expeditiously, and economically be produced by extruding a strip or slab of rubber from an extruding machine 3, shown conventionally in Fig. 1 having a die opening which will produce a strip or slab of rubber 1 of the desired width and thickness.

A strip or web of fabric 2 of sufficient width to enable it to be wrapped around or encompass the rubber strip, is led from a suitable source, not shown, over a guide roller 4 at which point the rubber strip issuing from the extruding machine is superposed on the fabric centrally of the width thereof. From the guide roller the assembled strips pass to folding means which may be in the shape of rollers 5 journaled to rotate about vertical axes, and rollers 6 journaled to rotate about horizontal parallel axes. The rollers 5 and 6 fold the margins of the fabric about the rubber strip or body and press it against the strip with sufficient force to cause it to adhere thereto.

The covered strip thus produced may be cut into suitable lengths and is then ready for shaping and vulcanizing. This is accomplished by providing a mold comprising lower and upper sections 7 and 8 having the customary dowel pins and openings. The lower mold section has the main portion of its bottom formed as a plane surface, being curved upward at the sides for a purpose hereinafter set forth. The upper section has its molding face provided with a pair of parallel approximately wedge shaped ribs $8^a$ which, when the mold is closed, press or force the upper fabric surface down to form two parallel channels $1^a$ in the covered strip, the rubber being forced laterally or displaced by the pressure of the ribs $8^a$, whereby lines of fold are formed in the strip. Preferably the ribs $8^a$ are made of such height that practically all the rubber is displaced at the fold lines and the upper and lower layers of the fabric are pressed together at the bottom of the channels and united by the adherent rubber, so that flexible fabric hinges are provided. The side margins of the male and female portions of the mold sections are so curved that after the mold has been closed and subjected to vulcanizing heat the article will have the shape shown in Fig. 3, providing an intermediate base portion and two side wings flexibly connected thereto and provided with curved outer edges or margins. Such strips, in addition to being very rapidly and economically manufactured, may be shipped to the trade without loss of space as they may be piled one upon the other.

When the article is to be applied to the window the marginal portions are folded up perpendicular to the base as shown in Fig. 4, for placing in the door frame of the car or other window frame space. The side wings being held in the position shown in Fig. 4 by the door frame, their inwardly deflected edges yieldingly grip the edges of the glass in a manner that will be readily apparent.

If desired a thin flexible metal reinforcing sheet may be embodied in the rubber strip as indicated at 9 in Fig. 5. Such metal strips may be readily incorporated in the rubber by providing an extruding machine having a die head which enables the metal strip to be passed through the die opening and the rubber to be extruded around it, such machines being well known to those skilled in the art and needing no further description herein. Such strip if desired may be of reticulated metal.

I claim:

1. A method of making window guides which consists in providing a strip of rubber compound with a fabric covering on both its faces, forming parallel grooves by pressure applied to one face of the strip on parallel lines while maintaining the portions of the other face opposite said lines against distortion whereby the fabric on the first face only is depressed on said parallel lines and the rubber displaced thereby laterally in its own plane, and vulcanizing the strip so shaped while maintaining said pressure.

2. A method of making window guides which consists in providing a strip of rubber compound with a fabric covering on opposite faces thereof, deflecting the margins and forming parallel grooves by pressure applied to one face of the strip whereby the fabric on such face is depressed and the rubber displaced laterally in the plane of the strip, and fully vulcanizing the strip so shaped while continuing such pressure.

3. A method of forming window guides which consists in providing a strip of rubber compound with a fabric covering completely enclosing the same, holding the central portion of one face of the strip against distortion, and applying pressure to the opposite face along parallel lines sufficient to laterally displace substantially all the rubber between the fabric covering layers and bringing said layers in juxtaposition to form a fabric hinge.

4. The hereindescribed method of forming a flexible window guide, which consists in extruding a strip of unvulcanized rubber compound, enveloping the strip in a covering of fabric, molding and vulcanizing the fabric covered strip in substantially flat form with a pair of parallel channels formed in one face equidistant from the margins while maintaining the portions of the face opposite said channels against deflection and folding the substantially flat vulcanized strip into channel form about the channels as hinges.

5. The method of making channel window guides which consists in superimposing a strip of vulcanizable plastic material on a strip of covering material, folding the covering material to substantially cover all sides of the strip, severing the strip into suitable lengths, and subjecting such lengths to a single forming and vulcanizing operation whereby said strip is substantially trisected to provide parallel hinging lines.

In testimony whereof, I affix my signature.

RICHARD T. GRIFFITHS.